US012423103B2

(12) United States Patent
Licht et al.

(10) Patent No.: US 12,423,103 B2
(45) Date of Patent: Sep. 23, 2025

(54) INSTRUCTION DECODE CLUSTER OFFLINING

(71) Applicant: Intel Corporation, Santa Clara, CA (US)

(72) Inventors: Martin Licht, Round Rock, TX (US); Jonathan Combs, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 17/549,192

(22) Filed: Dec. 13, 2021

(65) Prior Publication Data

US 2023/0185572 A1    Jun. 15, 2023

(51) Int. Cl.
*G06F 9/38* (2018.01)
*G06F 1/3287* (2019.01)
*G06F 9/30* (2018.01)

(52) U.S. Cl.
CPC ........ *G06F 9/30145* (2013.01); *G06F 1/3287* (2013.01); *G06F 9/3802* (2013.01); *G06F 9/3818* (2013.01); *G06F 9/3822* (2013.01)

(58) Field of Classification Search
None
See application file for complete search history.

(56) References Cited

U.S. PATENT DOCUMENTS

| 5,479,616 | A | * | 12/1995 | Garibay, Jr. | .......... | G06F 9/3802 |
| | | | | | | 712/E9.055 |
| 5,630,083 | A | * | 5/1997 | Carbine | .............. | G06F 9/30145 |
| | | | | | | 712/E9.072 |
| 5,715,440 | A | * | 2/1998 | Ohmura | ............... | G06F 11/3648 |
| | | | | | | 714/E11.214 |
| 5,742,781 | A | | 4/1998 | Bajwa | | |
| 5,870,578 | A | * | 2/1999 | Mahalingaiah | ....... | G06F 9/3885 |
| | | | | | | 712/210 |
| 6,684,319 | B1 | * | 1/2004 | Mohamed | ............. | G06F 9/3802 |
| | | | | | | 712/E9.055 |
| 7,200,723 | B1 | * | 4/2007 | Ansari | ................ | G06F 9/30181 |
| | | | | | | 712/E9.035 |
| 7,346,759 | B1 | * | 3/2008 | Ansari | ................ | G06F 9/30181 |
| | | | | | | 712/34 |
| 7,590,823 | B1 | * | 9/2009 | Ansari | ................ | G06F 9/30145 |
| | | | | | | 712/34 |
| 9,710,277 | B2 | * | 7/2017 | Madduri | ............... | G06F 9/3822 |
| 10,331,454 | B2 | * | 6/2019 | Combs | .................. | G06F 9/3802 |
| 11,586,441 | B2 | * | 2/2023 | Kalamatianos | ....... | G06F 9/3824 |

(Continued)

FOREIGN PATENT DOCUMENTS

EP    4428682 A1 *    9/2024    ............... G06F 9/38

OTHER PUBLICATIONS

Extended European Search Report from European Patent Application No. 22206823.1 notified Apr. 20, 2023, 9 pgs.

*Primary Examiner* — Steven G Snyder
(74) *Attorney, Agent, or Firm* — Essential Patents Group, LLP

(57) ABSTRACT

An embodiment of an integrated circuit may comprise a core and an instruction decoder communicatively coupled to the core to decode one or more instructions for execution by the core, where the instruction decoder includes two or more decode clusters in a parallel arrangement, and circuitry to offline a decode cluster of the two or more decode clusters. Other embodiments are disclosed and claimed.

15 Claims, 15 Drawing Sheets

(56) References Cited

U.S. PATENT DOCUMENTS

| | | | |
|---|---|---|---|
| 12,190,157 B2* | 1/2025 | Seo | G06F 9/5027 |
| 2005/0138335 A1* | 6/2005 | Samra | G06F 1/3287 |
| | | | 712/E9.063 |
| 2012/0079242 A1 | 3/2012 | Madduri et al. | |
| 2015/0324239 A1* | 11/2015 | Venkumahanti | G06F 9/3851 |
| | | | 718/104 |
| 2018/0004512 A1* | 1/2018 | Combs | G06F 9/30152 |
| 2018/0088956 A1* | 3/2018 | Combs | G06F 9/3822 |
| 2018/0157490 A1 | 6/2018 | Craske | |
| 2021/0149672 A1* | 5/2021 | Kalamatianos | G06F 9/382 |
| 2022/0100500 A1* | 3/2022 | Madaelil | G06F 9/382 |
| 2022/0100569 A1* | 3/2022 | Seo | G06F 9/5027 |
| 2023/0315473 A1* | 10/2023 | Azeem | G06F 9/382 |
| | | | 712/213 |
| 2023/0401067 A1* | 12/2023 | Lowes | G06F 9/3822 |

* cited by examiner

| CLUSTER OFFLINE FOR POWER SAVINGS ||||||
|---|---|---|---|---|---|
| FN = FETCH STREAM N ||||||
| TN = TOGGLE FOR FETCH STREAM N ||||||
| DTN = DOUBLE TOGGLE FOR FETCH STREAM N ||||||
| FETCH CYCLE | CLUSTER0 | CLUSTER1 | CLUSTER2 | OFFLINE ACTIVE | |
| 0 | F0 T0 | | | 0 | |
| 1 | | F1 T1 | | 0 | |
| 2 | | | F2 T2 | 0 | |
| 3 | F3 T3 | | | 0 | |
| 4 | | F4 T4 | | 1 | CLUSTER0 CHOSEN OFFLINE |
| 5 | | | F5 DT5 | 1 | |
| 6 | | F6 T6 | | 1 | |
| 7 | | | F7 DT7 | 1 | |
| 8 | | F8 T8 | | 0 | CLUSTER0 BACK ONLINE |
| 9 | | | F9 T9 | 0 | |
| 10 | F10 T10 | | | 0 | |
| 11 | | F11 T11 | | 0 | |

FIG. 5

| CLUSTER OFFLINE FOR PREFETCH | | | | | |
|---|---|---|---|---|---|
| FN = FETCH STREAM N | | | | | |
| TN = TOGGLE FOR FETCH STREAM N | | | | | |
| DTN = DOUBLE TOGGLE FOR FETCH STREAM N | | | | | |
| PFN = PREFETCH STREAM N | | | | | |
| FETCH CYCLE | CLUSTER0 | CLUSTER1 | CLUSTER2 | OFFLINE ACTIVE | |
| 0 | F0 T0 | | | 0 | |
| 1 | | F1 T1 | | 1 | CLUSTER0 CHOSEN OFFLINE |
| 2 | | | F2 DT2 | 1 | |
| 3 | PF0 | | | 1 | |
| 4 | | F3 T3 | | 1 | |
| 5 | | | F4 DT4 | 1 | |
| 6 | | F5 T5 | | 1 | |
| 7 | PF1 | | | 1 | |
| 8 | | | F6 DT6 | 1 | |
| 9 | | F7 T7 | | 1 | |
| 10 | | | F8 DT8 | 1 | |
| 11 | | F9 T9 | | 0 | CLUSTER0 BACK ONLINE |
| 12 | | | F10 T10 | | |
| 13 | F11 T11 | | | | |

FIG. 6

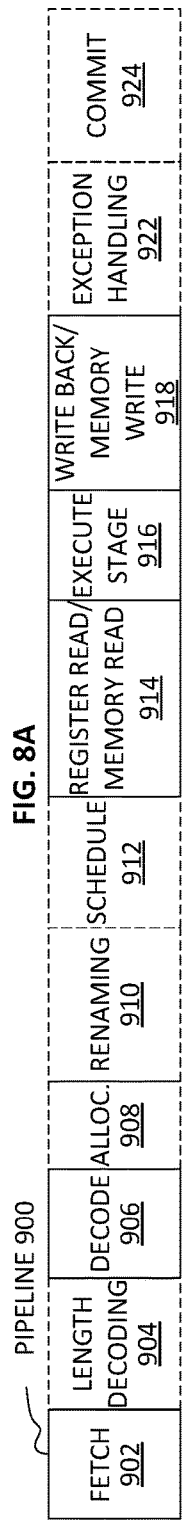
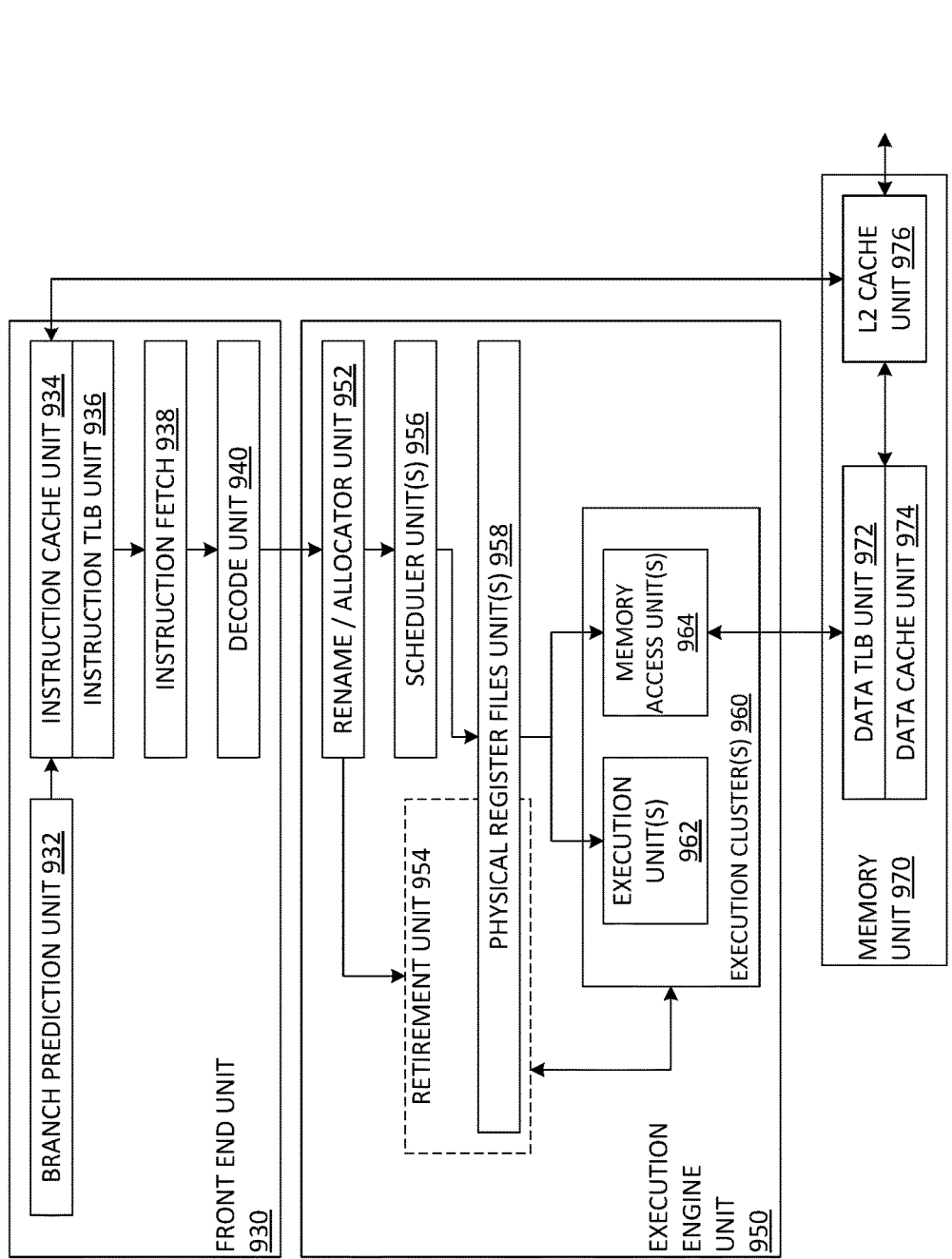
FIG. 8A
FIG. 8B

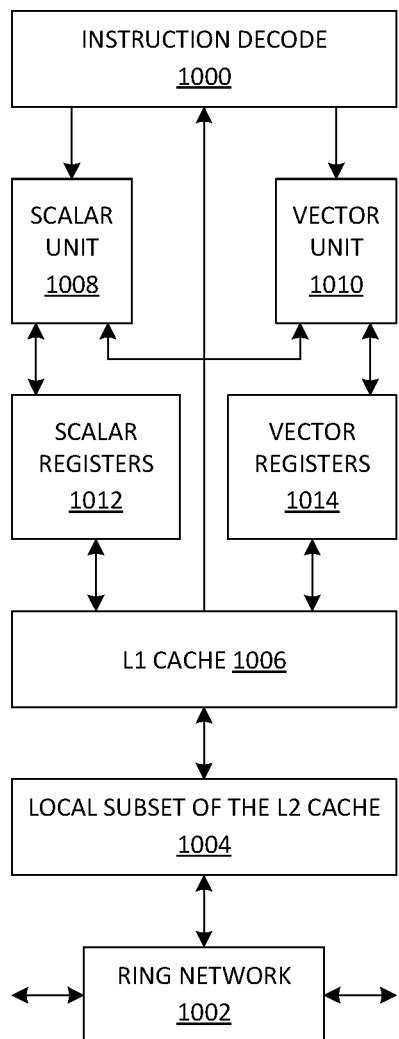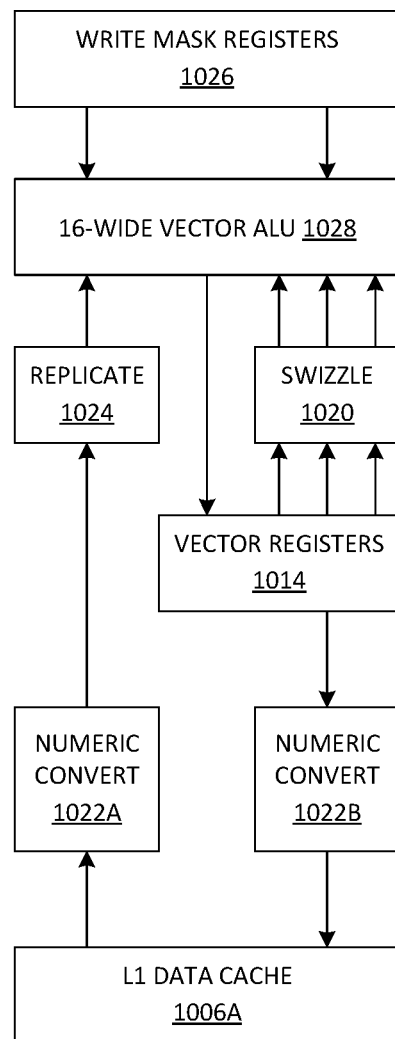
FIG. 9A
FIG. 9B

INSTRUCTION DECODE CLUSTER OFFLINING

BACKGROUND

1. Technical Field

This disclosure generally relates to processor technology, and instruction decode technology.

2. Background Art

An instruction cycle for a processor or core may involve fetch, decode, and execution of instructions. Parallel and/or out-of-order processors may include multiple decoders to decode more than one instruction at a time. A decode unit than can decode N instructions at a time may be referred to as an N-wide decoder (e.g., 4-wide, 8-wide, etc.).

BRIEF DESCRIPTION OF THE DRAWINGS

The various embodiments of the present invention are illustrated by way of example, and not by way of limitation, in the figures of the accompanying drawings and in which:

FIG. 5 is an illustrative diagram of an example of taking a cluster offline for power savings according to an embodiment;

FIG. 6 is an illustrative diagram of an example of taking a cluster offline for prefetch activity according to an embodiment;

FIG. 8A is a block diagram illustrating both an exemplary in-order pipeline and an exemplary register renaming, out-of-order issue/execution pipeline according to embodiments of the invention;

FIG. 8B is a block diagram illustrating both an exemplary embodiment of an in-order architecture core and an exemplary register renaming, out-of-order issue/execution architecture core to be included in a processor according to embodiments of the invention;

FIGS. 9A-B illustrate a block diagram of a more specific exemplary in-order core architecture, which core would be one of several logic blocks (including other cores of the same type and/or different types) in a chip;

DETAILED DESCRIPTION

Figure 1:
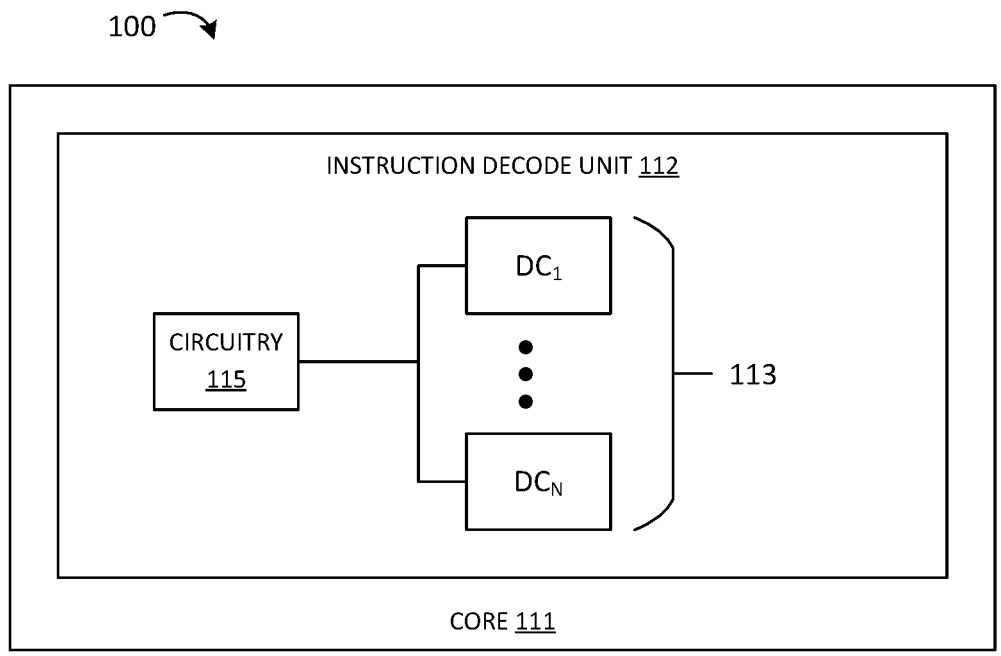
FIG. 1 is a block diagram of an example of an integrated circuit according to an embodiment.

Embodiments discussed herein variously provide techniques and mechanisms for instruction decode cluster offlining. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to take a decode cluster offline.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As used herein, a decode cluster refers to one or more components of an instruction decoder that participate in the decode of a particular instruction (e.g., an instruction pointer (IP) queue, an instruction cache (Icache) data queue, a decoder, an instruction queue, etc.). In a conventional instruction decoder, all of the decode clusters are utilized for instruction decode activity. Conventional instruction prefetch may include partial page walks and cache requests at higher levels of memory hierarchy, or stalling system software to serially insert requests for the instruction translation look-aside buffer (ITLB) or instruction cache. For some groups of instructions (e.g., dynamic code that is running), utilizing more decode clusters does not necessarily improve the performance of the processor. Some embodiments overcome one or more of the foregoing problems.

Some embodiments provide technology for offlining decode cluster(s). Advantageously, some embodiments may increase processor performance by utilizing parallel decode clusters to perform software or hardware initiated instruction prefetch activities (e.g., ITLB page walks and fills, instruction cache requests and fills, instruction end byte detection with predecode cache storage, branch predictor updates, etc.) in parallel with running system software. Some embodiments may additionally or alternatively disable a cluster entirely if metrics determine that there is no performance benefit with the current dynamic code that is running, advantageously reducing processor power consumption.

With reference to FIG. 1, an embodiment of an integrated circuit 100 may include a core 111, and an instruction decoder 112 coupled to the core 111 to decode one or more instructions for execution by the core 111. The instruction decoder 112 may include two or more decode clusters 113 (e.g., DC1 through DCN, where N>1) in a parallel arrangement, and circuitry 115 to offline a decode cluster of the two or more decode clusters 113. For example, the circuitry 115 may be configured to power down the offlined decode cluster, and/or to utilize the offlined decode cluster for a prefetch activity.

In some embodiments, the circuitry 115 may be further configured to utilize the offlined decode cluster for the prefetch activity in parallel with instruction decode activity on non-offlined decode clusters of the two or more decode clusters. The circuitry 115 may also be configured to skip the offlined decode cluster for any instruction decode activity on the non-offlined decode clusters of the two or more decode clusters, and/or to coordinate a determination of an order of one or more fetch streams for the offlined decode cluster and the non-offlined decode clusters of the two or more decode clusters. For example, the prefetch activity may include one or more of an ITLB page walk, an ITLB fill, an instruction cache request, and instruction cache fill, an instruction end byte detection, and a branch prediction update. In some embodiments, the circuitry 115 may be further configured to offline two or more decode clusters and to utilize one or more of the offlined decode clusters for prefetch activity and/or to power down one or more of the offlined decode clusters.

Figure 14:
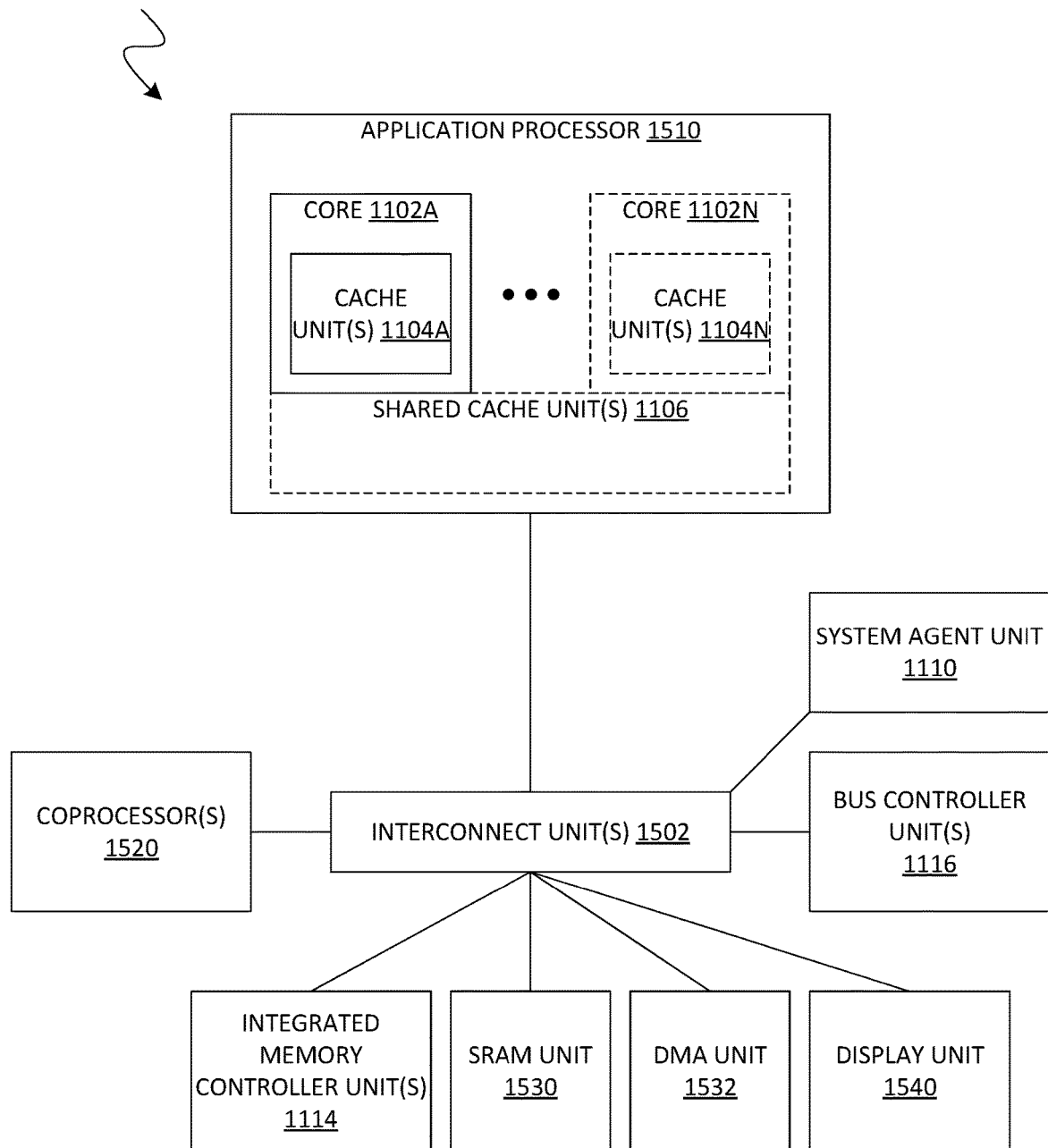
Figure 15:
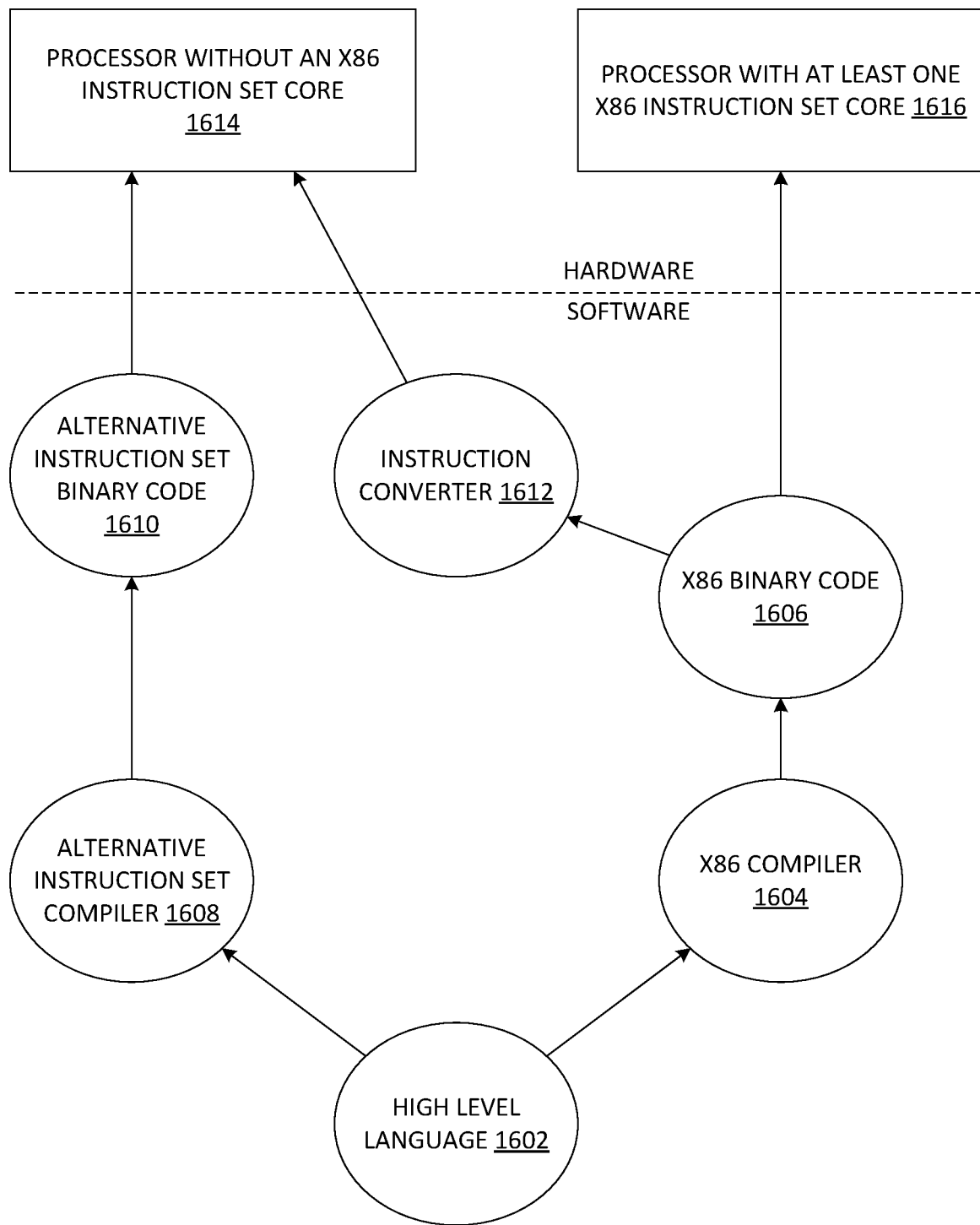
FIG. 15 is a block diagram contrasting the use of a software instruction converter to convert binary instructions in a source instruction set to binary instructions in a target instruction set according to embodiments of the invention.

Embodiments of the instruction decoder 112, the decode clusters 113, and/or the circuitry 115 may be incorporated in a processor including, for example, the core 990 (FIG. 8B), the cores 1102A-N (FIGS. 10, 14), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the coprocessor 1520 (FIG. 14), and/or the processors 1614, 1616 (FIG. 15). In particular, embodiments of the instruction decoder 112 and/or the circuitry 115 may be incorporated in the front end unit 930 (FIG. 8B).

Figure 2A:
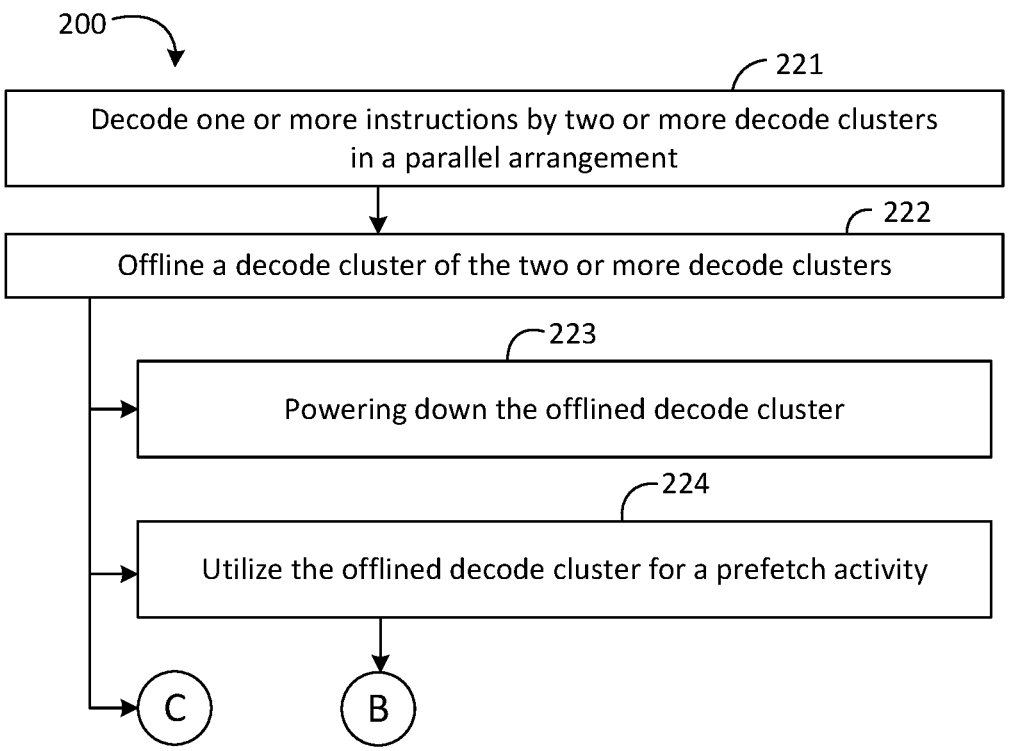
FIGS. 2A to 2C are flow diagrams of an example of a method according to an embodiment.
Figure 2B:
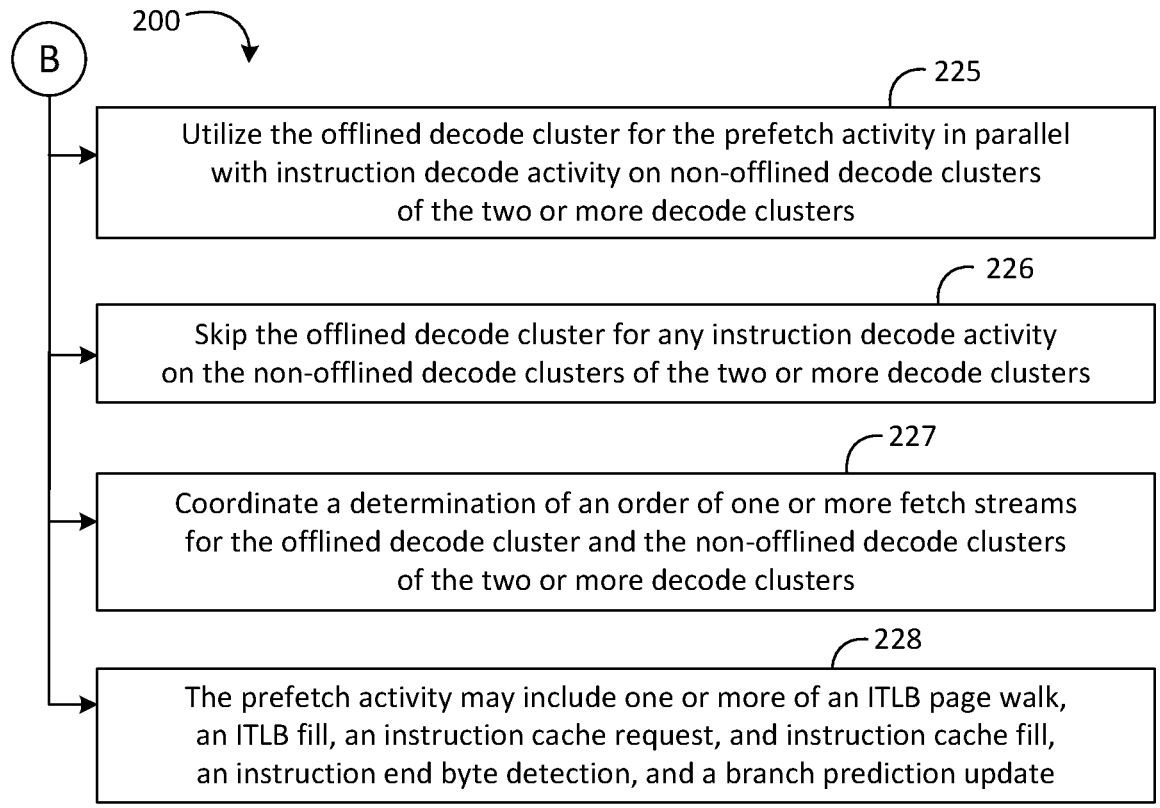
Figure 2C:
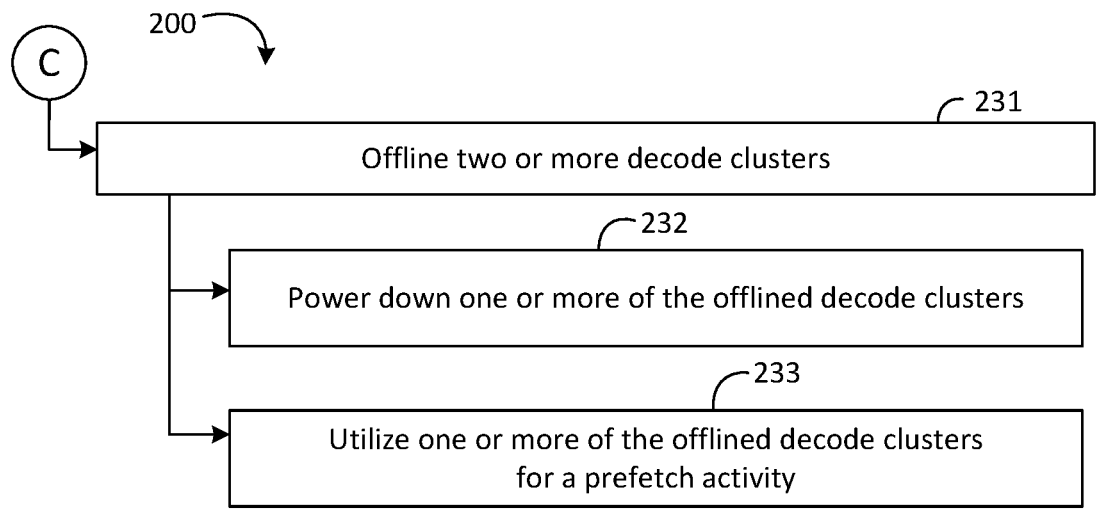

With reference to FIGS. 2A to 2C, an embodiment of a method 200 may include decoding one or more instructions by two or more decode clusters in a parallel arrangement at box 221, and offlining a decode cluster of the two or more decode clusters at box 222. Some embodiments of the method 200 may further include powering down the offlined decode cluster at box 223, and/or utilizing the offlined decode cluster for a prefetch activity at box 224. For example, the method 200 may include utilizing the offlined decode cluster for the prefetch activity in parallel with instruction decode activity on non-offlined decode clusters of the two or more decode clusters at box 225. Some embodiments of the method 200 may additionally or alternatively include skipping the offlined decode cluster for any instruction decode activity on the non-offlined decode clusters of the two or more decode clusters at box 226, and/or coordinating a determination of an order of one or more fetch streams for the offlined decode cluster and the non-offlined decode clusters of the two or more decode clusters at box 227. In some embodiments, the prefetch activity may include one or more of an ITLB page walk, an ITLB fill, an instruction cache request, and instruction cache fill, an instruction end byte detection, and a branch prediction update at box 228. In some embodiments, the method 200 may further include offlining two or more decode clusters at box 231, powering down one or more of the offlined decode clusters at box 232, and/or utilizing one or more of the offlined decode clusters for prefetch activity at box 233.

Figure 3:
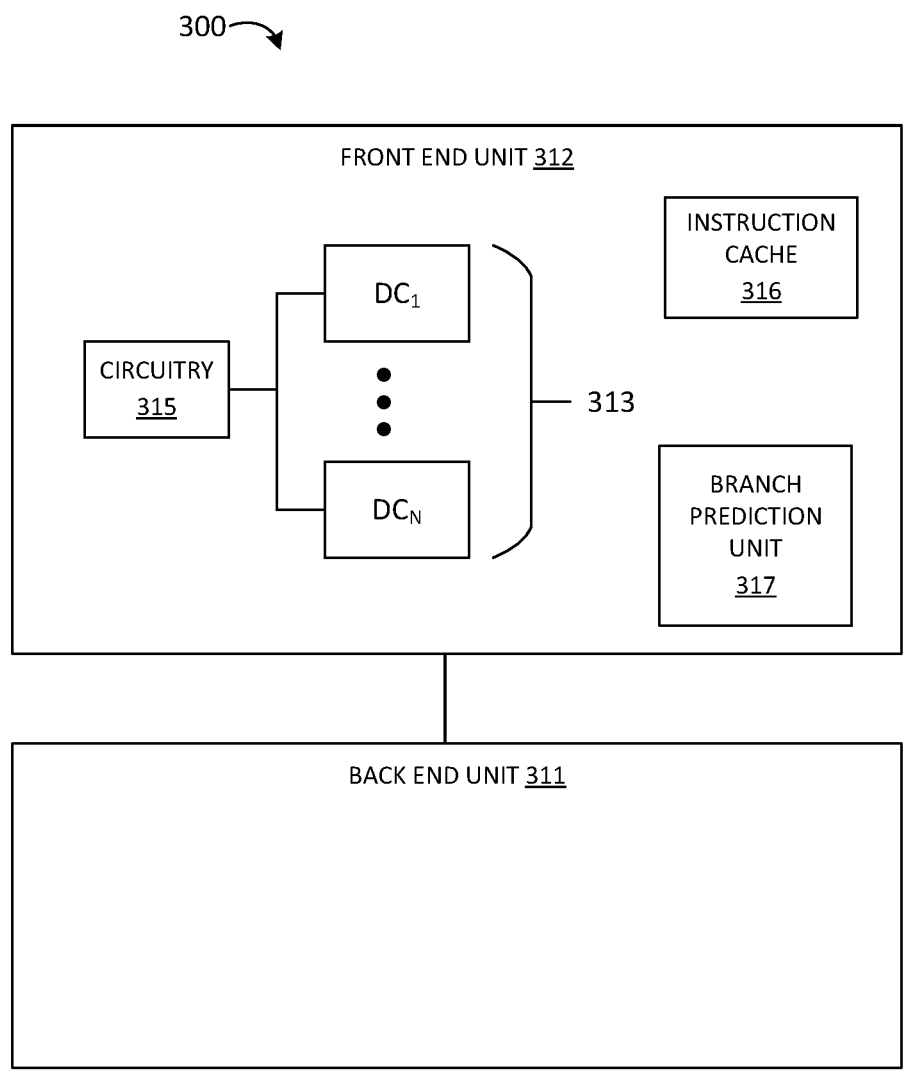
FIG. 3 is a block diagram of an example of an apparatus according to an embodiment.

With reference to FIG. 3, an embodiment of an apparatus 300 may include a back end unit 311 to execute one or more decoded instructions, and a front end unit 312 communicatively coupled to the back end unit 311 to decode one or more instructions. The front end unit 312 may include two or more decode clusters 313 (e.g., DC1 through DCN, where N>1) in a parallel arrangement, and circuitry 315 to offline a decode cluster of the two or more decode clusters 313. For example, the circuitry 315 may be configured to power down the offlined decode cluster, and/or to utilize the offlined decode cluster for a prefetch activity.

In some embodiments, the circuitry 315 may be further configured to utilize the offlined decode cluster for the prefetch activity in parallel with instruction decode activity on non-offlined decode clusters of the two or more decode clusters. The circuitry 315 may also be configured to skip the offlined decode cluster for any instruction decode activity on the non-offlined decode clusters of the two or more decode clusters, and/or to coordinate a determination of an order of one or more fetch streams for the offlined decode cluster and the non-offlined decode clusters of the two or more decode clusters. For example, the front-end unit 312 may further include an instruction cache 316 and a branch prediction unit 317, and the prefetch activity may include one or more of an ITLB page walk, an ITLB fill, an instruction cache request, and instruction cache fill, an instruction end byte detection, and a branch prediction update. In some embodiments, the circuitry 315 may be further configured to offline two or more decode clusters and to utilize one or more of the offlined decode clusters for prefetch activity and/or to power down one or more of the offlined decode clusters.

Embodiments of the front end unit 312, the decode clusters 313, the circuitry 315, the instruction cache 316, and/or the branch prediction unit 317 may be incorporated in a processor including, for example, the core 990 (FIG. 8B), the cores 1102A-N (FIGS. 10, 14), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the coprocessor 1520 (FIG. 14), and/or the processors 1614, 1616 (FIG. 15). In particular, embodiments of the circuitry 315, the instruction cache 316, and/or the branch prediction unit 317 may be incorporated in the front end unit 930 (FIG. 8B).

Some embodiments may include technology (e.g., hardware circuitry) to dynamically take a decode cluster offline with respect to system software such that the offline decode cluster may be used for prefetching activities or powered down to save power. For example, embodiments of decode cluster offlining technology provide the ability to keep multiple clusters running in parallel while skipping the cluster that was taken offline. Embodiments may also provide technology for hardware support to allow prefetches from hardware or software to update TLB and cache structures to different memory hierarchy levels (e.g., up to Icache and ITLB without filling those structures, or including fills into Icache and ITLB) and update end byte detection mechanisms including the predecode cache and branch prediction structures.

For software prefetch instructions and hardware prefetch techniques, some embodiments provide the ability to warm up the ITLB, the Icache, the predecode cache, and branch predictors in parallel with the system code that is running, advantageously increasing the efficiency and performance of the processor and reducing power consumption. With the ability to take a decode cluster offline dynamically, some embodiments enable the detection of when powering down a cluster to reduce power consumption may be more efficient without impacting performance.

Figure 4:
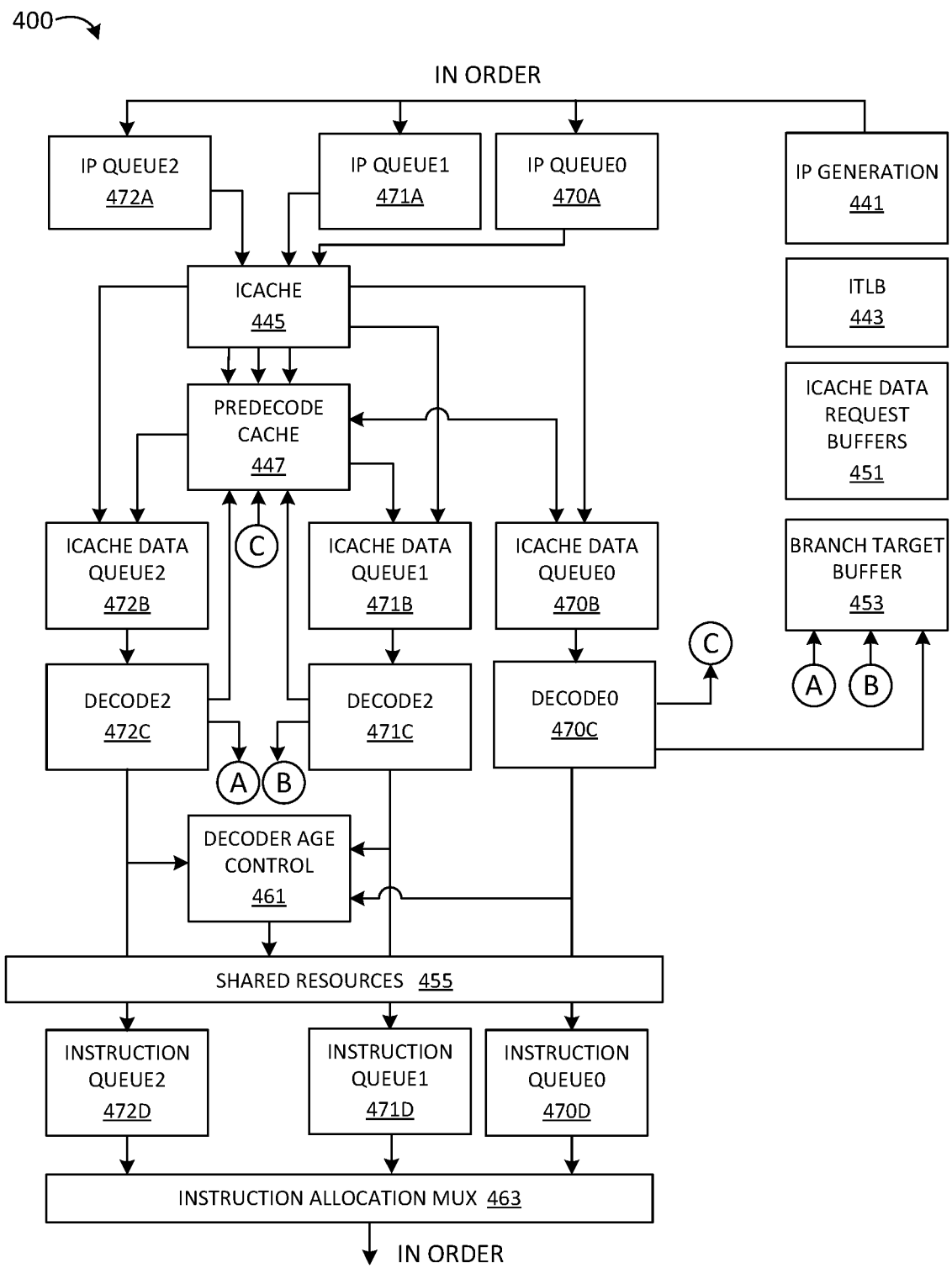
FIG. 4 is a block diagram of an example of a front end unit according to an embodiment.

With reference to FIG. 4, an embodiment of a front end unit 400 includes an IP generation circuit (IP Gen) 441, an ITLB 443, an Icache 445, a predecode cache 447, Icache data request buffers 451, a branch target buffer 453, shared resources 455, decoder age control circuitry 461, and an instruction allocation mux 463, coupled as shown. The front end unit 400 further includes three decode clusters, nominally referred to as Cluster 0, Cluster 1, and Cluster 2. Cluster 0 includes an IP queue 470A (IP Queue0), an instruction cache data queue 470B (Icache Data Queue0), a decoder 470C (Decode0), and an instruction queue 470D (Instruction Queue0), coupled as shown. Cluster 1 includes an IP queue 471A (IP Queue1), an instruction cache data queue 471B (Icache Data Queue1), a decoder 471C (Decode1), and an instruction queue 471D (Instruction Queue1), coupled as shown. Cluster 2 includes an IP queue 472A (IP Queue2), an instruction cache data queue 472B (Icache Data Queue2), a decoder 472C (Decode2), and an instruction queue 472D (Instruction Queue2), coupled as shown.

Some embodiments may allow bypassing one or more of the multiple decode clusters from active software flow without interrupting software activity on the remaining decode clusters. The bypassed decode cluster(s) may be powered down to save dynamic power, when the code stream is determined to not require the full width of the front end decode clusters, or the bypassed decode cluster(s) may be used for prefetching activities. Furthermore, some embodiments may allow prefetches initiated by either software or hardware mechanisms the ability of to use a bypassed decode cluster for warming up the ITLB 443, Icache 445, predecode cache 447, and/or branch predictors (not shown) for instruction streams that will be used by instruction fetches in the near future. While conventional prefetch mechanisms can only be used for prefetching data into higher level TLBs and memory cache structures, in some embodiments a full decode cluster is available for prefetch and thus enables the ability to fill ITLB and Icache structures. Some embodiments may then run the raw data bytes through instruction decode which can be used to find instruction lengths (e.g., for marking the predecode cache 447) and branch instructions and targets which can be used to update branch prediction mechanisms.

In a clustered decode system, decoding is allowed out of order in parallel. When instructions reach the allocation stage after the instruction queue, the instructions are stitched back in order. An instruction queue in-order restitching multiplexer (mux) enables a retire-order buffer to be allocated in order before instructions are sent to execution units. The proper ordering may be detected by indications sent from the instruction fetch stage that indicate when instruction flow is toggled to a next decode cluster. A toggle is signaled for a taken branch predicted by the branch prediction unit or a fake branch inserted by the branch prediction unit for helping balance the load between different decode clusters. For offlining a decode cluster, some embodiments allow a toggle to completely skip a decode cluster that has been taken offline. A toggle that skips a decode cluster may be referred to herein as a double toggle.

To initiate offlining of a decode cluster, the IP Gen 441 may see a request from software or hardware to offline a decode cluster. At that time, the IP Gen 441 may be actively fetching to any decode cluster. An embodiment of offlining technology may determine a cluster that is set to receive the next fetch and select an offline cluster that is farthest from the next fetch cluster. For example, in a three decode cluster system if the next fetch will go to cluster X then an embodiment of decode cluster offlining technology will choose to offline the furthest cluster from the next fetch cluster determined by (X+2) modulo 3. After the offline cluster is chosen, the IP Gen 441 will be put into a decode cluster offlining mode and will skip over the offline cluster when detecting toggle points by signaling a double toggle for the cluster before the offline cluster. Table 1 shows an example of an example offlining decision matrix for a 3-wide decode unit (e.g., such as illustrated in FIG. 4):

TABLE 1

Three Cluster Example of Offlining Decision

| Next Fetch Cluster | Offline Cluster | Double Toggle Cluster |
|---|---|---|
| Cluster0 | Cluster2 | Cluster1 |
| Cluster1 | Cluster0 | Cluster2 |
| Cluster2 | Cluster1 | Cluster0 |

FIG. 5 shows an example of taking a cluster offline for power savings, in accordance with an embodiment. All decode clusters are online for fetch cycles 0 through 3, with no request to take a cluster offline (e.g., OFFLINE ACTIVE=0) and a single toggle signaled with each fetch stream. At fetch cycle 4, there is a request to take a cluster offline (e.g., OFFLINE ACTIVE=1). Because the cluster that is set to receive the next fetch is Cluster1, Cluster0 is chosen for the offline cluster and Cluster2 is set as the double toggle cluster. Cluster0 is powered down and remains offline and inactive through fetch cycle 8, during which double toggles are signaled with fetch streams F5 and F7 for Cluster2. At fetch cycle 8, there is a request or indication that the offline cluster may go back online (e.g., OFFLINE ACTIVE=0). Cluster0 is then powered up and goes back online, and single toggles are then signaled with each fetch stream.

FIG. 6 shows an example of taking a cluster offline for prefetch activity, in accordance with an embodiment. All decode clusters are online for fetch cycle 0, with no request to take a cluster offline (e.g., OFFLINE ACTIVE=0). At fetch cycle 1, there is a request to take a cluster offline (e.g., OFFLINE ACTIVE=1). Because the cluster that is set to receive the next fetch is Cluster1, Cluster0 is chosen for the offline cluster and Cluster2 is set as the double toggle cluster. Cluster0 is taken offline through fetch cycle 11, during which double toggles are signaled with fetch streams for Cluster2. At fetch cycles 3 and 7, Cluster0 is utilized for prefetch activity. At fetch cycle 11, there is a request or indication that the offline cluster may go back online (e.g., OFFLINE ACTIVE=0). Cluster0 is then goes back online, and single toggles are signaled with each fetch stream (e.g., until a subsequent request to offline a cluster).

Some embodiments may include hardware in the fetch engine to allow prefetch activity to update end byte markers and branch predictors without filling the ITLB by storing a separate translation just for prefetches. Embodiments of such fetch engine hardware allows software the flexibility to have the page translation loaded into the higher level shared TLB without utilizing the ITLB resource but still get the benefit of the Icache fill, end byte marker detection, and branch prediction updates.

Decode blocks (e.g., Decode0, Decode1, Decode3) and an instruction allocation mux need to know the order of the fetch streams, also referred to as age. The decode blocks utilize the age of each cycle's decode with respect to the other clusters decoding in that same cycle in order to distribute shared resources that are only given to the oldest fetch (e.g., to avoid scenarios where a hang can occur if a younger cluster holds a resource needed by the oldest cluster to make forward progress). The instruction queue mux utilizes the age of each instruction to be able to stitch the pieces back in order. Conventionally, fetches in order only change clusters when that decode cluster has a toggle. Accordingly, the decoders can keep track of the number of toggles sent to the instruction queue for each decode cluster to know which clusters is the oldest (e.g., the cluster with the least number of toggles is the oldest).

For fully dynamic support of offlining and onlining a decode cluster, some embodiments include circuitry (e.g., the decoder age control circuitry 461) to coordinate the age determination in the decoders because the offline cluster was skipped and won't send a toggle to the instruction queue even though its relative age is changing along with the double toggle from the previous cluster. To handle the age determination at decode time, embodiments may properly handle multiple different scenarios: 1) For keeping the offline cluster toggle count (and thus age) correct the previous cluster's double toggles must eventually add one to the toggle count of the offline cluster; 2) The offline cluster may still have older instructions in its decoder even though the previous cluster has started sending double toggles to the instruction queue; 3) The offline cluster may have finished its offline activities and started back on the normal decode path before the previous cluster has decoded any double toggles yet; and/or 4) No double toggles happen while the decode cluster is offline.

Starting at fetch time, some embodiments indicate which decode cluster is offline and if there are any double toggles detected by fetch that have NOT yet been decoded. Embodiments disallow initiating a new cluster offline case until all previous cluster offline double toggles have been written to the instruction queue. With the cluster offline indication and the double toggle tracking through the decoders all the way to the instruction queue, the decoders can track the age between different clusters based on double toggle decodes and know when to update toggle counts for the offline decode cluster.

In the following pseudo code: entry_double_toggle_detected indicates that the first double toggle has been written to the instruction queue; entry_toggle_count indicates the double toggle cluster's toggle count just before the first double toggle is encountered; exit_double_toggle_detected indicates that the last double toggle has been written to the instruction queue; and exit_toggle_count indicates the double toggle cluster's toggle count just after the last double toggle is encountered. Example pseudo code:

```
if (my_cluster_offline & entry_double_toggle_detected
    & (offline_decode_cluster_age>entry_toggle_count))
{
    if(exit_double_toggle_detected)
        {my_decode_cluster_next_age=exit_toggle_count}
    else{my_decode_cluster_next_age=double_toggle_
        cluster_age}
}
else {my_decode_cluster_next_age=my_decode_cluster_
    age+my_cluster_toggle}
```

In some embodiments, the prefetch instructions in the decoder may utilize similar techniques as a normal decode for detecting and storing end byte markers and branch prediction information, together with circuitry to stop the prefetch instructions from writing valid data into the instruction queue. For example, the circuitry may send the prefetch indication from fetch through decode and then qualify away the valid indication to the instruction queue if the decode is associated with prefetch activity from an offline decode cluster. Also, there are some cases for the decode of certain instruction types that would normally stop a decoder to wait for some serializing action. Some embodiments may include circuitry to allow the decoder to continue past those points for prefetch activity from an offline decode cluster because the prefetch activity may just be looking for end byte markers and branch prediction information from the raw bytes.

Along with handling the age correctly in the decode cluster, embodiments of an instruction queue mux may include circuitry to detect double toggles for skipping a decode cluster when stitching the micro-operations back in order. For example, the instruction queue mux circuitry may utilize the double toggle indication to move past the offline cluster when stitching the micro-operations together in that cycle.

Figure 7:
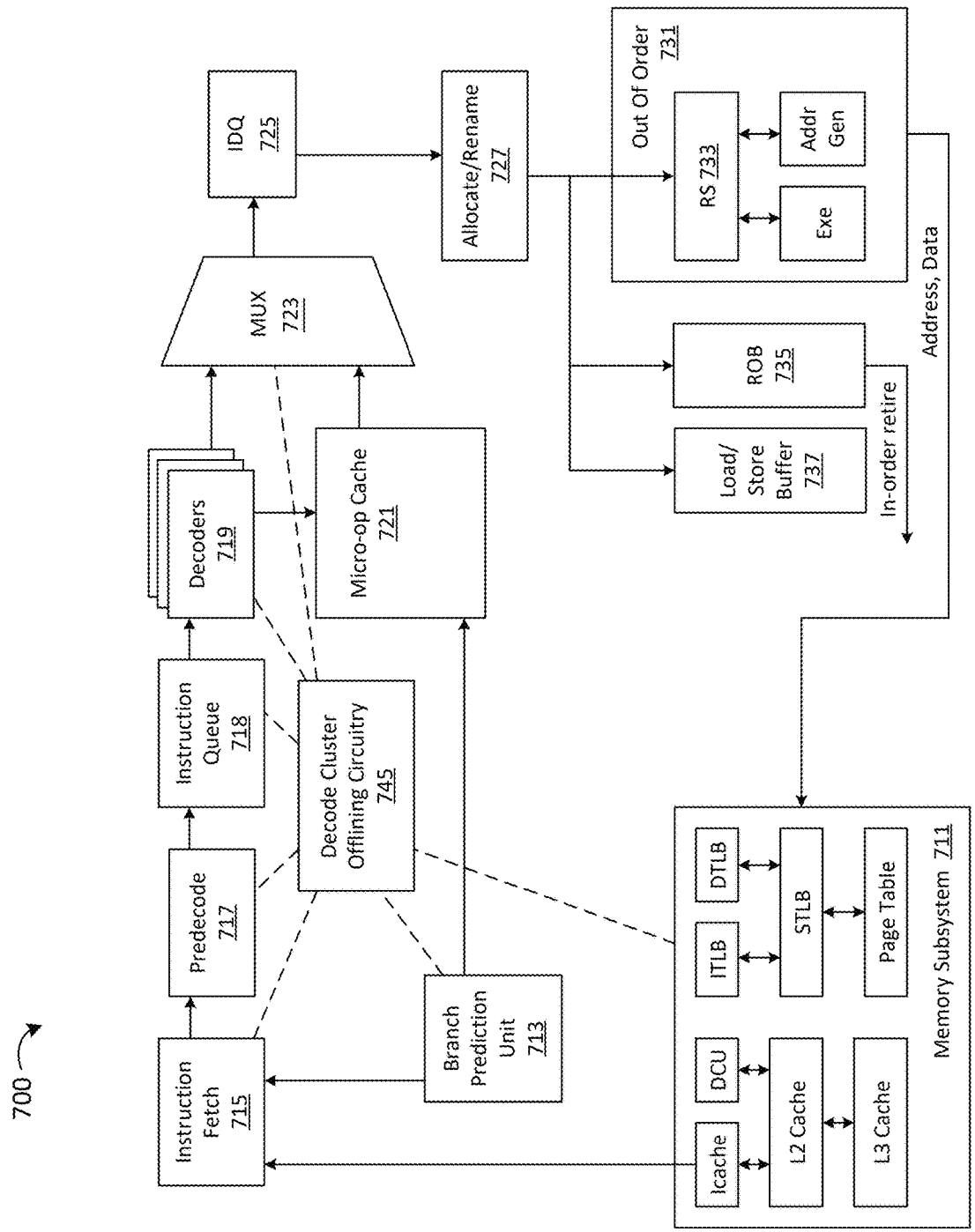
FIG. 7 is a block diagram of an example of an out-of-order processor according to an embodiment.

With reference to FIG. 7, an embodiment of an out-of-order (OOO) processor 700 includes a memory subsystem 711, a branch prediction unit 713, an instruction fetch circuit 715, a predecode circuit 717, an instruction queue 718, decoders 719, a micro-op cache 721, a mux 723, an instruction decode queue (IDQ) 725, an allocate/rename circuit 727, an out-of-order core 731, a reservation station (RS) 733, a re-order buffer (ROB) 735, and a load/store buffer 737, connected as shown. The memory subsystem 711 include a L1 instruction cache (I-cache), a L1 data cache (DCU), a L2 cache, a L3 cache, an ITLB, a data translation lookaside buffer (DTLB), a shared translation lookaside buffer (STLB), and a page table, connected as shown. The OOO core 731 includes a reservation station (RS), an Exe circuit, and an address generation circuit, connected as shown. The microarchitecture of the OOO processor 700 further includes decode cluster offlining circuitry 745, and other circuitry, to enable offlining of one or more decode clusters of the OOO processor 700. Although shown as a separate block, portions of the decode cluster offlining circuitry may be distributed throughout various components of the core including, for example, the branch prediction unit 713, the instruction fetch circuit 715, the predecode circuit 717, the instruction queue 718, the decoders 719, the mux 723, etc.

The circuitry 745 may be configured to implement one or more aspects of the embodiments described herein. For example, the decoders 719 may be part of two or more decode clusters in a parallel arrangement, and the circuitry 745 may be configured to offline a decode cluster of the two or more decode clusters. For example, the circuitry 745 may be configured to power down the offlined decode cluster, and/or to utilize the offlined decode cluster for a prefetch activity.

In some embodiments, the circuitry 745 may be further configured to utilize the offlined decode cluster for the prefetch activity in parallel with instruction decode activity on non-offlined decode clusters of the two or more decode clusters. The circuitry 745 may also be configured to skip the offlined decode cluster for any instruction decode activity on the non-offlined decode clusters of the two or more decode clusters, and/or to coordinate a determination of an order of one or more fetch streams for the offlined decode cluster and the non-offlined decode clusters of the two or more decode clusters. For example, the prefetch activity may include one or more of an ITLB page walk, an ITLB fill, an instruction cache request, and instruction cache fill, an instruction end byte detection, and a branch prediction update. In some embodiments, the circuitry 745 may be further configured to offline two or more decode clusters and to utilize one or more of the offlined decode clusters for prefetch activity and/or to power down one or more of the offlined decode clusters.

Advantageously, some embodiments of the circuitry 745 may bypass one or more of the decode clusters of the OOO processor 700 from active software flow without interrupting software activity on the remaining decode clusters of the OOO processor 700. The bypassed decode cluster(s) may be powered down to save dynamic power (e.g., when the code stream is determined to not require the full width of the front end decode clusters), or the bypassed decode cluster(s) may be used for prefetching activities. Some embodiments of the circuitry 745 may support prefetches initiated by either software or hardware to use a bypassed decode cluster for warming up the various TLBs of the memory subsystem 711, the Icache of the memory subsystem 711, a predecode cache associated with the predecode circuit 717, and/or branch predictors of the branch prediction unit 713 for instruction streams that will be used by instruction fetches in the near future. In some embodiments, a full decode cluster is available for prefetch and thus enables the ability to fill TLB and cache structures. Some embodiments may then run the raw data bytes through instruction decode which can be used to find instruction lengths (e.g., for marking the predecode cache) and branch instructions and targets which can be used to update branch prediction mechanisms.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 8B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 10:
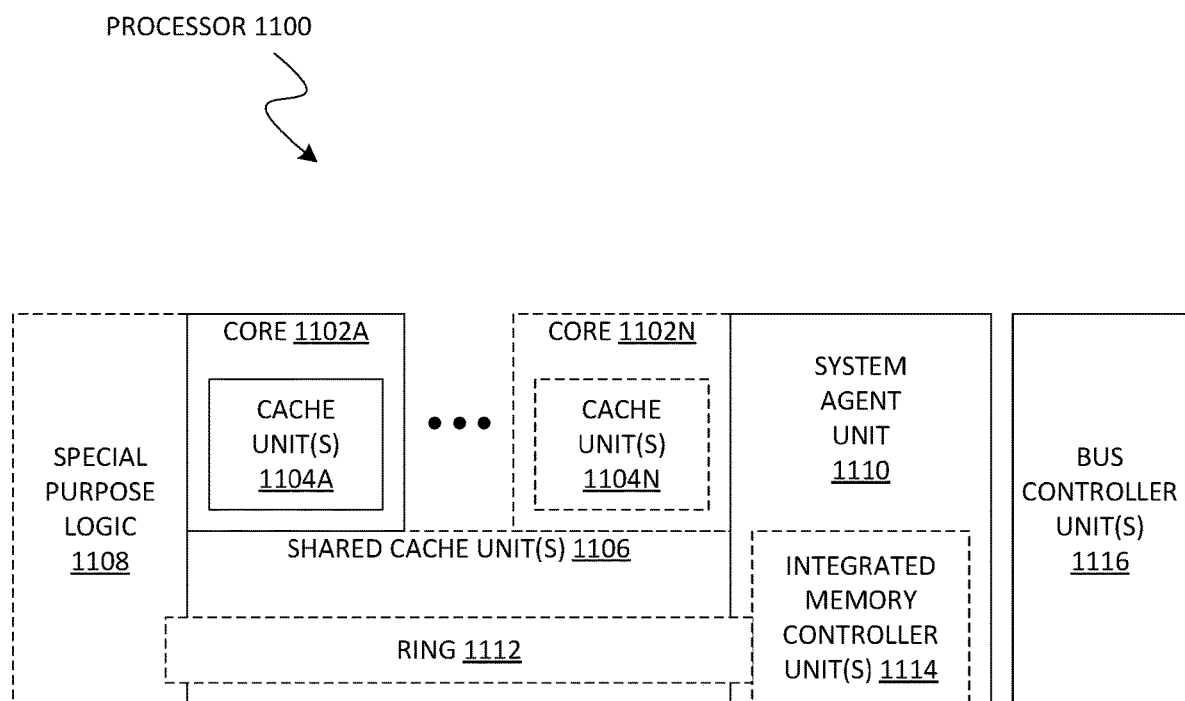
FIG. 10 is a block diagram of a processor that may have more than one core, may have an integrated memory controller, and may have integrated graphics according to embodiments of the invention.

FIG. 10 is a block diagram of a processor 1100 that may have more than one core, may have an integrated memory controller, and may have integrated graphics according to embodiments of the invention. The solid lined boxes in FIG. 10 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
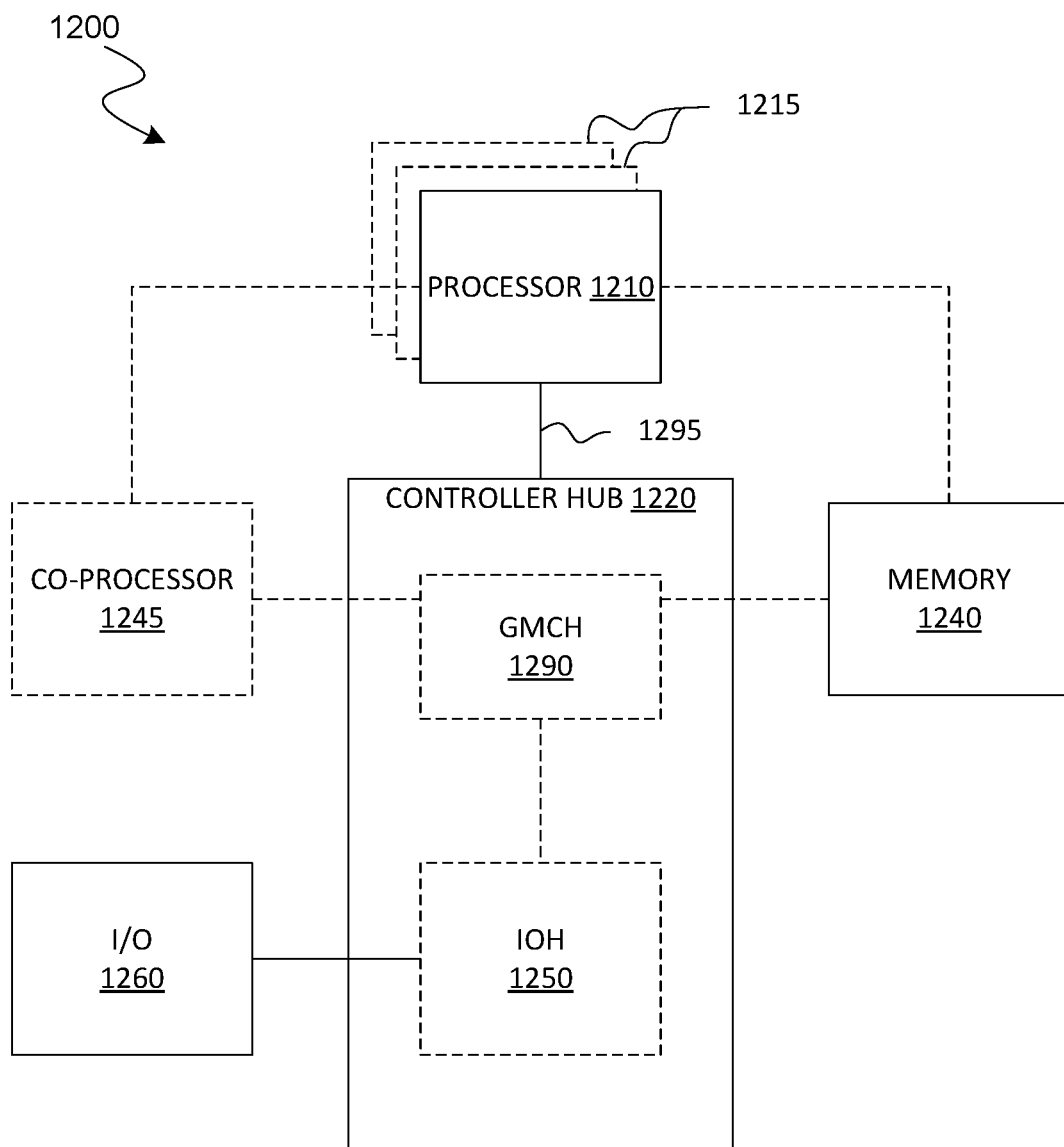
FIGS. 11-14 are block diagrams of exemplary computer architectures.

Referring now to FIG. 11, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 11 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 12:
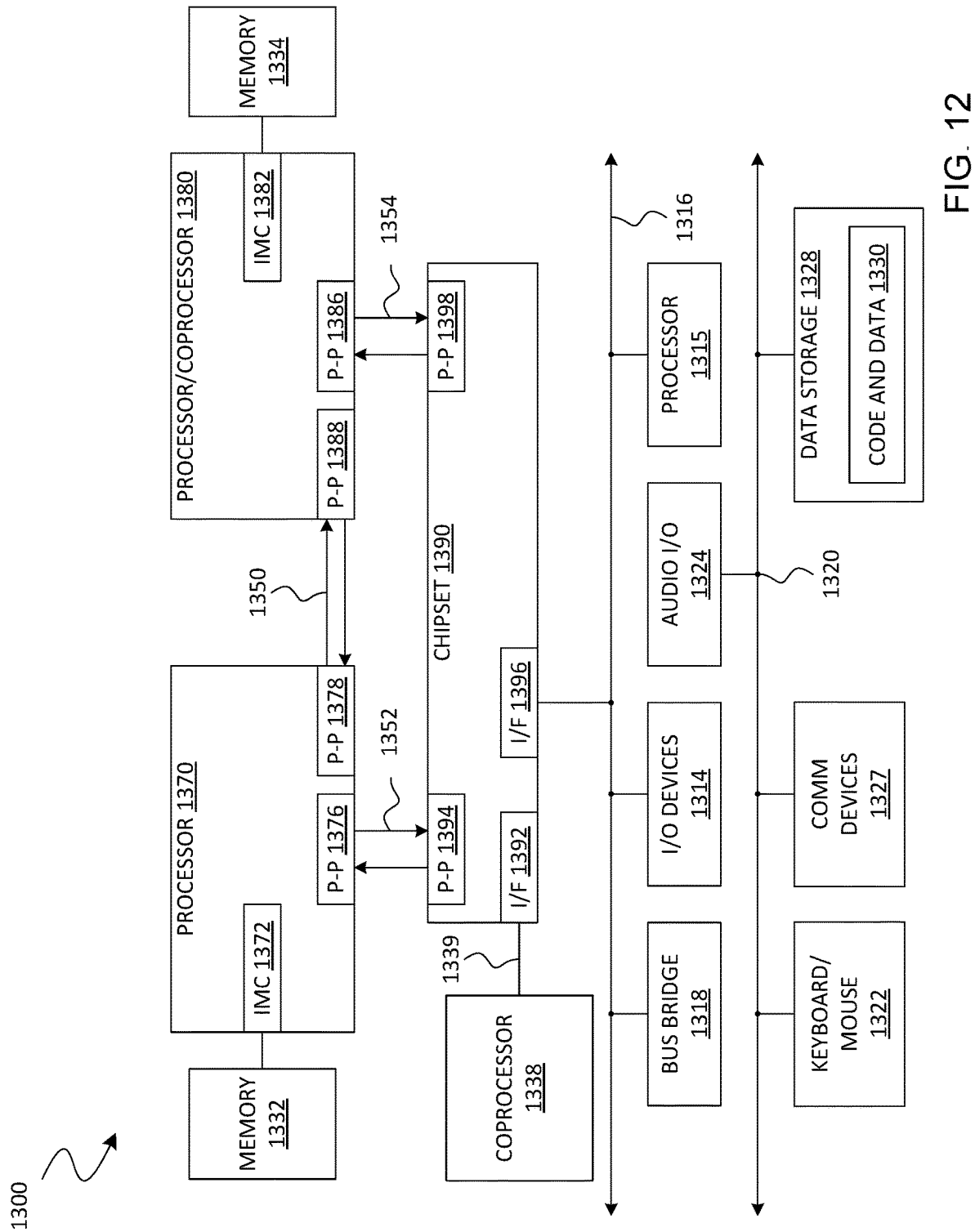

Referring now to FIG. 12, shown is a block diagram of a first more specific exemplary system 1300 in accordance with an embodiment of the present invention. As shown in FIG. 12, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 12, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 12, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 12, a system may implement a multi-drop bus or other such architecture.

Figure 13:
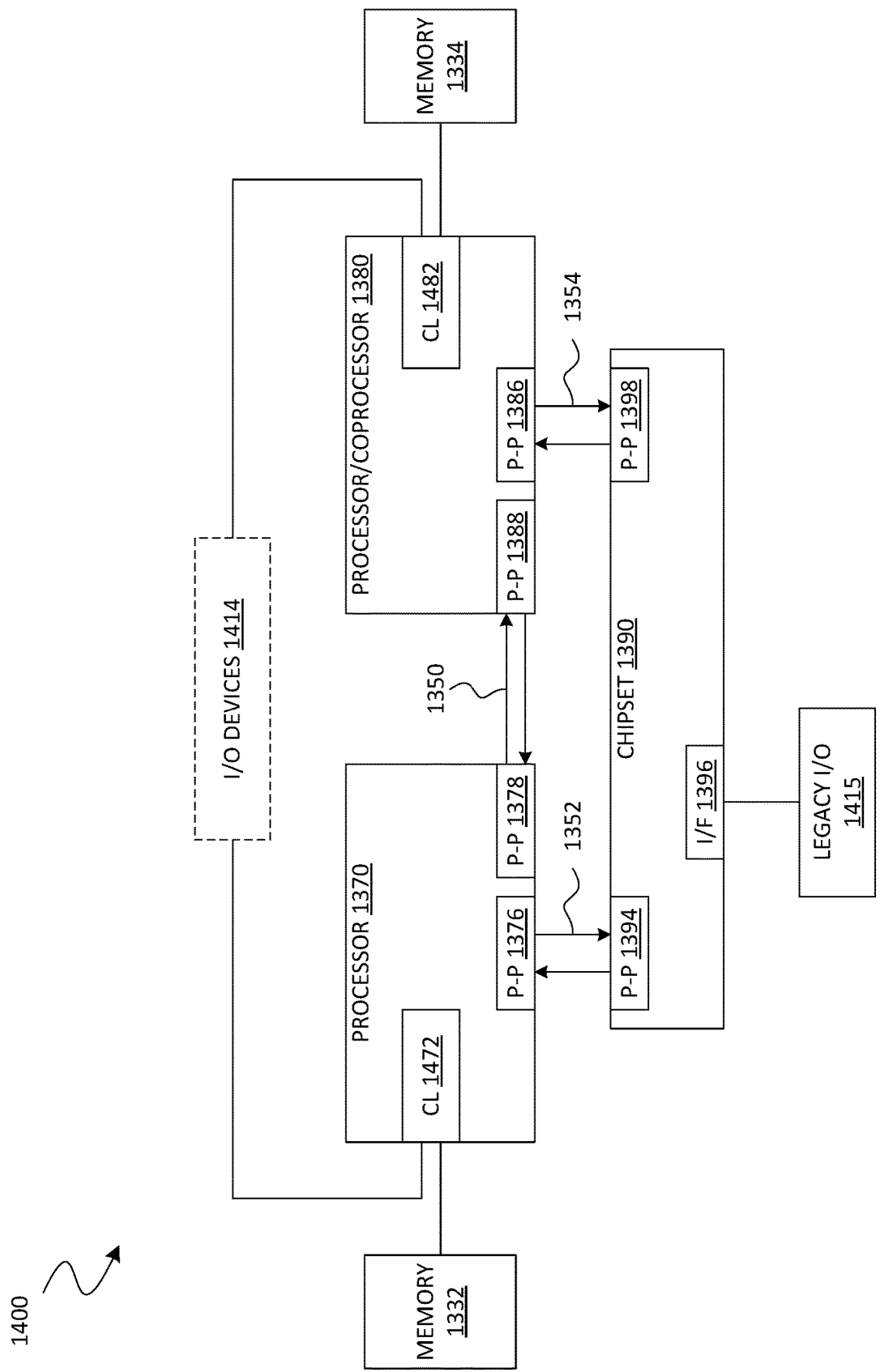

Referring now to FIG. 13, shown is a block diagram of a second more specific exemplary system 1400 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL") 1472 and 1482, respectively. Thus, the CL 1472, 1482 include integrated memory controller units and include I/O control logic. FIG. 13 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 14, shown is a block diagram of a SoC 1500 in accordance with an embodiment of the present invention. Similar elements in FIG. 10 bear like reference numerals. Also, dashed lined boxes are optional features on more advanced SoCs. In FIG. 14, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 15 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for instruction decode cluster offlining are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Additional Notes and Examples

Example 1 includes an integrated circuit, comprising a core, and an instruction decoder communicatively coupled to the core to decode one or more instructions for execution by the core, wherein the instruction decoder includes two or more decode clusters in a parallel arrangement, and circuitry to offline a decode cluster of the two or more decode clusters.

Example 2 includes the integrated circuit of Example 1, wherein the circuitry is further to power down the offlined decode cluster.

Example 3 includes the integrated circuit of any of Examples 1 to 2, wherein the circuitry is further to utilize the offlined decode cluster for a prefetch activity.

Example 4 includes the integrated circuit of Example 3, wherein the circuitry is further to utilize the offlined decode cluster for the prefetch activity in parallel with instruction decode activity on non-offlined decode clusters of the two or more decode clusters.

Example 5 includes the integrated circuit of Example 4, wherein the circuitry is further to skip the offlined decode cluster for any instruction decode activity on the non-offlined decode clusters of the two or more decode clusters.

Example 6 includes the integrated circuit of any of Examples 4 to 5, wherein the circuitry is further to coordinate a determination of an order of one or more fetch streams for the offlined decode cluster and the non-offlined decode clusters of the two or more decode clusters.

Example 7 includes the integrated circuit of any of Examples 3 to 6, wherein the prefetch activity includes one or more of an instruction ITLB page walk, an ITLB fill, an instruction cache request, and instruction cache fill, an instruction end byte detection, and a branch prediction update.

Example 8 includes a method, comprising decoding one or more instructions by two or more decode clusters in a parallel arrangement, and offlining a decode cluster of the two or more decode clusters.

Example 9 includes the method of Example 8, further comprising powering down the offlined decode cluster.

Example 10 includes the method of any of Examples 8 to 9, further comprising utilizing the offlined decode cluster for a prefetch activity.

Example 11 includes the method of Example 10, further comprising utilizing the offlined decode cluster for the prefetch activity in parallel with instruction decode activity on non-offlined decode clusters of the two or more decode clusters.

Example 12 includes the method of Example 11, further comprising skipping the offlined decode cluster for any instruction decode activity on the non-offlined decode clusters of the two or more decode clusters.

Example 13 includes the method of any of Examples 11 to 12, further comprising coordinating a determination of an order of one or more fetch streams for the offlined decode cluster and the non-offlined decode clusters of the two or more decode clusters.

Example 14 includes the method of any of Examples 10 to 13, wherein the prefetch activity includes one or more of an instruction ITLB page walk, an ITLB fill, an instruction cache request, and instruction cache fill, an instruction end byte detection, and a branch prediction update.

Example 15 includes an apparatus, comprising a back end unit to execute one or more decoded instructions, and a front end unit communicatively coupled to the back end unit to decode one or more instructions, wherein the front end unit includes two or more decode clusters in a parallel arrangement, and circuitry to offline a decode cluster of the two or more decode clusters.

Example 16 includes the apparatus of Example 15, wherein the circuitry is further to power down the offlined decode cluster.

Example 17 includes the apparatus of any of Examples 15 to 16, wherein the circuitry is further to utilize the offlined decode cluster for a prefetch activity.

Example 18 includes the apparatus of Example 17, wherein the circuitry is further to utilize the offlined decode cluster for the prefetch activity in parallel with instruction decode activity on non-offlined decode clusters of the two or more decode clusters.

Example 19 includes the apparatus of Example 18, wherein the circuitry is further to skip the offlined decode cluster for any instruction decode activity on the non-offlined decode clusters of the two or more decode clusters.

Example 20 includes the apparatus of any of Examples 18 to 19, wherein the circuitry is further to coordinate a determination of an order of one or more fetch streams for the offlined decode cluster and the non-offlined decode clusters of the two or more decode clusters.

Example 21 includes the apparatus of any of Examples 17 to 20, wherein the prefetch activity includes one or more of an instruction ITLB page walk, an ITLB fill, an instruction cache request, and instruction cache fill, an instruction end byte detection, and a branch prediction update.

Example 22 includes an apparatus, comprising means for decoding one or more instructions by two or more decode clusters in a parallel arrangement, and means for offlining a decode cluster of the two or more decode clusters.

Example 23 includes the apparatus of Example 22, further comprising means for powering down the offlined decode cluster.

Example 24 includes the apparatus of any of Examples 22 to 23, further comprising means for utilizing the offlined decode cluster for a prefetch activity.

Example 25 includes the apparatus of Example 24, further comprising means for utilizing the offlined decode cluster for the prefetch activity in parallel with instruction decode activity on non-offlined decode clusters of the two or more decode clusters.

Example 26 includes the apparatus of Example 25, further comprising means for skipping the offlined decode cluster for any instruction decode activity on the non-offlined decode clusters of the two or more decode clusters.

Example 27 includes the apparatus of any of Examples 25 to 26, further comprising means for coordinating a determination of an order of one or more fetch streams for the offlined decode cluster and the non-offlined decode clusters of the two or more decode clusters.

Example 28 includes the apparatus of any of Examples 24 to 27, wherein the prefetch activity includes one or more of an instruction ITLB page walk, an ITLB fill, an instruction cache request, and instruction cache fill, an instruction end byte detection, and a branch prediction update.

Example 29 includes at least one non-transitory machine readable medium comprising a plurality of instructions that, in response to being executed on a computing device, cause the computing device to decode one or more instructions by two or more decode clusters in a parallel arrangement, and offline a decode cluster of the two or more decode clusters.

Example 30 includes the at least one non-transitory machine readable medium of Example 29, comprising a plurality of further instructions that, in response to being executed on the computing device, cause the computing device to power down the offlined decode cluster.

Example 31 includes the at least one non-transitory machine readable medium of any of Examples 29 to 30, comprising a plurality of further instructions that, in response to being executed on the computing device, cause the computing device to utilize the offlined decode cluster for a prefetch activity.

Example 32 includes the at least one non-transitory machine readable medium of Example 31, comprising a plurality of further instructions that, in response to being executed on the computing device, cause the computing device to utilize the offlined decode cluster for the prefetch activity in parallel with instruction decode activity on non-offlined decode clusters of the two or more decode clusters.

Example 33 includes the at least one non-transitory machine readable medium of Example 32, comprising a plurality of further instructions that, in response to being executed on the computing device, cause the computing device to skip the offlined decode cluster for any instruction decode activity on the non-offlined decode clusters of the two or more decode clusters.

Example 34 includes the at least one non-transitory machine readable medium of any of Examples 32 to 33, comprising a plurality of further instructions that, in response to being executed on the computing device, cause the computing device to coordinating a determination of an order of one or more fetch streams for the offlined decode cluster and the non-offlined decode clusters of the two or more decode clusters.

Example 35 includes the at least one non-transitory machine readable medium of any of Examples 31 to 34, wherein the prefetch activity includes one or more of an instruction ITLB page walk, an ITLB fill, an instruction cache request, and instruction cache fill, an instruction end byte detection, and a branch prediction update.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising: a core an execution unit to execute instructions; and
    an instruction decoder communicatively coupled to the execution unit, wherein the instruction decoder comprises:
        multiple decode clusters coupled, in parallel with each other, to receive and decode portions of one or more fetch streams, wherein the portions are to be received, each by a respective decode cluster of the multiple decode clusters, based on an order of the multiple decode clusters relative to each other; and
        circuitry coupled to the multiple decode clusters, the circuitry to:
            perform a transition of a first decode cluster of the multiple decode clusters from an online state with respect to the one or more fetch streams, to an offline state with respect to the one or more fetch streams, wherein:
                while in the online state, the first decode cluster is to be included in the order of the multiple decode clusters relative to each other; and
                while in the offline state, the first decode cluster is to be bypassed in the order of the multiple decode clusters relative to each other;
            generate a control signal based on one or more bypasses of the first decode cluster; and
            provide the control signal to operate a multiplexer circuit which is to be coupled between the multiple decode clusters and one or more instruction queues.

2. The integrated circuit of claim 1, wherein the circuitry is further to:
    power down the first decode cluster while the first decode cluster is in the offline state.

3. The integrated circuit of claim 1, wherein the circuitry is further to:
    utilize the first decode cluster for a prefetch activity while the first decode cluster is in the offline state.

4. The integrated circuit of claim 3, wherein the circuitry is to:
    utilize the first decode cluster for the prefetch activity in parallel with instruction decode activity on one or more online decode clusters of the multiple decode clusters.

5. The integrated circuit of claim 4, wherein the prefetch activity includes one or more of an instruction translation look-aside buffer (ITLB) page walk, an ITLB fill, an instruction cache request, and instruction cache fill, an instruction end byte detection, and a branch prediction update.

6. A method at a processor, the method comprising:
    receiving portions of one or more fetch streams with multiple decode clusters which are coupled in parallel with each other, wherein the portions are received, each by a respective decode cluster of the multiple decode clusters, based on an order of the multiple decode clusters relative to each other;
    decoding the portions with the multiple decode clusters;
    during the decoding, performing a transition of a first decode cluster of the multiple decode clusters from an online state with respect to the one or more fetch streams, to an offline state with respect to the one or more fetch streams, wherein:
        while in the online state, the first decode cluster is included in the order of the multiple decode clusters relative to each other; and
        while in the offline state, the first decode cluster is bypassed in the order of the multiple decode clusters relative to each other;
    generating a control signal based on one or more bypasses of the first decode cluster; and
    operating a multiplexer circuit with the control signal, wherein the multiplexer circuit is coupled between the multiple decode clusters and one or more instruction queues.

7. The method of claim 6, further comprising:
    powering down the first decode cluster while the first decode cluster is in the offline state.

8. The method of claim 6, further comprising:
    utilizing the first decode cluster for a prefetch activity while the first decode cluster is in the offline state.

9. The method of claim 8, further comprising:
    utilizing the first decode cluster for the prefetch activity in parallel with instruction decode activity on one or more online decode clusters of the multiple decode clusters.

10. The method of claim 9, wherein the prefetch activity includes one or more of an instruction translation look-aside buffer (ITLB) page walk, an ITLB fill, an instruction cache request, and instruction cache fill, an instruction end byte detection, and a branch prediction update.

11. An apparatus, comprising:
a back end unit to execute one or more decoded instructions; and
a front end unit communicatively coupled to the back end unit to decode one or more instructions, wherein the front end unit comprises:
multiple decode clusters coupled, in parallel with each other, to receive and decode portions of one or more fetch streams, wherein the portions are to be received, each by a respective decode cluster of the multiple decode clusters, based on an order of the multiple decode clusters relative to each other; and
circuitry coupled to the multiple decode clusters, the circuitry to:
perform a transition of a first decode cluster of the multiple decode clusters from an online state with respect to the one or more fetch streams, to an offline state with respect to the one or more fetch streams, wherein:
while in the online state, the first decode cluster is to be included in the order of the multiple decode clusters relative to each other; and
while in the offline state, the first decode cluster is to be bypassed in the order of the multiple decode clusters relative to each other;
generate a control signal based on one or more bypasses of the first decode cluster; and
provide the control signal to operate a multiplexer circuit which is to be coupled between the multiple decode clusters and one or more instruction queues.

12. The apparatus of claim 11, wherein the circuitry is further to:
power down the first decode cluster while the first decode cluster is in the offline state.

13. The apparatus of claim 11, wherein the circuitry is further to:
utilize the first decode cluster for a prefetch activity while the first decode cluster is in the offline state.

14. The apparatus of claim 13, wherein the circuitry is to:
utilize the first decode cluster for the prefetch activity in parallel with instruction decode activity on non-offlined decode clusters of the multiple decode clusters.

15. The apparatus of claim 14, wherein the prefetch activity includes one or more of an instruction translation look-aside buffer (ITLB) page walk, an ITLB fill, an instruction cache request, and instruction cache fill, an instruction end byte detection, and a branch prediction update.

* * * * *